US012789321B2

(12) United States Patent
Petit et al.

(10) Patent No.: US 12,789,321 B2
(45) Date of Patent: Nov. 10, 2026

(54) CLEANING SYSTEM FOR CLEANING AN ELECTRONIC DEVICE

(71) Applicant: Assurant, Inc., New York, NY (US)

(72) Inventors: Daniel Petit, La Vergne, TN (US); Pete Bremer, La Vergne, TN (US); Najib Seguias-Bandry, Murfreesboro, TN (US)

(73) Assignee: Assurant, Inc., New York, NY (US)

( * ) Notice: Subject to any disclaimer, the term of this patent is extended or adjusted under 35 U.S.C. 154(b) by 45 days.

(21) Appl. No.: 18/975,978

(22) Filed: Dec. 10, 2024

(65) Prior Publication Data

US 2025/0214199 A1 Jul. 3, 2025

Related U.S. Application Data

(60) Provisional application No. 63/615,618, filed on Dec. 28, 2023.

(51) Int. Cl.

| | |
|---|---|
| ***B24C 1/00*** | (2006.01) |
| ***B08B 7/00*** | (2006.01) |
| ***B25J 9/16*** | (2006.01) |
| ***B25J 15/00*** | (2006.01) |
| ***B25J 17/02*** | (2006.01) |

(52) U.S. Cl.

CPC ................ *B24C 1/003* (2013.01); *B08B 7/00* (2013.01); *B25J 9/1697* (2013.01); *B25J 15/0019* (2013.01); *B25J 17/0283* (2013.01); *B25J 9/1682* (2013.01)

(58) Field of Classification Search

None

See application file for complete search history.

(56) References Cited

U.S. PATENT DOCUMENTS

| | | | |
|---|---|---|---|
| 2015/0118942 | A1 | 4/2015 | Hashish et al. |
| 2016/0141200 | A1 | 5/2016 | Takano |
| 2024/0332036 | A1 | 10/2024 | Yano et al. |

FOREIGN PATENT DOCUMENTS

| | | |
|---|---|---|
| JP | 2023-073793 A | 5/2023 |

OTHER PUBLICATIONS

Google Patents translation of JP2023073793A (Year: 2026).*

ISA/220—Notification of Transmittal or Search Report and Written Opinion of the ISA, or the Declaration Mailed on May 19, 2025 for WO Application No. PCT/US24/059183, 19 page(s).

* cited by examiner

*Primary Examiner* — Eric W Golightly

(74) *Attorney, Agent, or Firm* — Alston & Bird LLP

(57) ABSTRACT

A cleaning system for cleaning an electronic device includes an enclosure and at least one robot positioned within the enclosure. Each robot includes a robotic arm and an end effector coupled to the robotic arm. The cleaning system includes at least one nozzle positioned within the enclosure and at least one dry ice blasting machine configured to eject dry ice particles from the at least one nozzle. The robot is configured to position the electronic device proximate to the at least one nozzle to clean the electronic device with the dry ice particles that are ejected from the at least one nozzle.

18 Claims, 10 Drawing Sheets

CLEANING SYSTEM FOR CLEANING AN ELECTRONIC DEVICE

CROSS-REFERENCE TO RELATED APPLICATIONS

This application claims priority to U.S. Provisional Patent Application No. 63/615,618, filed Dec. 28, 2023, the contents of which are incorporated by reference herein in its entirety.

TECHNICAL FIELD

The present application relates generally to a cleaning system for cleaning an electronic device. More particularly, the present application relates to a cleaning system for cleaning an electronic device that utilizes at least one robot and a dry ice blasting machine to clean the electronic device.

BACKGROUND

Electronic devices, such as mobile telephones (e.g., smart phones), laptops, portable digital assistants, tablet computers, and the like are often sold on the secondary market. To determine a price to sell the pre-owned electronic devices, a quality grade of the electronic device may need to be determined. For example, pre-owned electronic devices often include defects, such as cracked or chipped screens, scratches to the body or the screen, damaged charging ports, etc. The quality grade of each electronic device may be determined based on the quantity of defects and/or the severity of defects. Pre-owned electronic devices with a higher quality grade may demand a higher price on the secondary market than devices with a lower quality grade.

The inventor has identified numerous deficiencies and problems with the existing technologies in this field. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include systems, methods, and apparatuses to provide for improved quality grade determinations of electronic devices. For example, embodiments of the present disclosure provided herein include systems, methods, and apparatuses to provide for improved cleaning of electronic devices, which may occur prior to the quality grade determination and improve the accuracy of the quality grade determination.

In various aspects, a cleaning system for cleaning an electronic device includes an enclosure that has a plurality of walls and a ceiling. The cleaning system may include at least one robot positioned within the enclosure. Each robot may include a robotic arm and an end effector coupled to the robotic arm. The cleaning system may include at least one nozzle positioned within the enclosure. The cleaning system may include at least one dry ice blasting machine coupled to the at least one nozzle. The at least one dry ice blasting machine may be configured to eject dry ice particles from the at least one nozzle. The robot may be configured to position the electronic device proximate to the at least one nozzle to clean the electronic device with the dry ice particles that are ejected from the at least one nozzle.

In various examples, the robot is configured to maintain a predetermined distance and a predetermined angle between the electronic device and the at least one nozzle in an instance in which the robot is positioning the electronic device proximate to the at least one nozzle and the electronic device is being cleaned.

In various examples, the predetermined angle is at least 25 degrees and up to 30 degrees and the predetermined distance is at least 150 millimeters and up to 200 millimeters.

In various examples, the cleaning system includes at least one acoustic panel coupled to at least one wall of the plurality of walls.

In various examples, the cleaning system comprises at least two robots positioned within the enclosure.

In various examples, two of the at least two robots comprise six-axis robot arms configured to engage the electronic device simultaneously.

In various examples, one of the at least two robots is configured to engage a second electronic device while another one of the at least two robots is engaging the electronic device.

In various examples, the cleaning system include at least two nozzles. At least one nozzle may be positioned on or proximate the ceiling of the enclosure and at least another nozzle may be positioned on or proximate a wall of the plurality of walls.

In various examples, the enclosure includes at least one opening sized for the electronic device to enter the enclosure through the at least one opening. The cleaning system may include at least one conveyor. Each conveyor may extend through a corresponding opening and be positioned at least partially within the enclosure. The end effector of the robot may be configured to engage the electronic device while the electronic device is positioned on the conveyor.

In various examples, the cleaning system includes at least one vision system that is configured to capture image data of the electronic device while the electronic device is positioned on the conveyor. The at least one vision system may include at least one processor configured to analyze the captured image data to determine pose data and size data of the electronic device. The at least one vision system may be configured to transmit the pose data and the size data to the at least one robot The at least one robot may be configured to use the pose data and the size data to facilitate engagement of the end effector with the electronic device while the electronic device is positioned on the conveyor.

In various examples, the cleaning system includes at least one vision system that is configured to read machine-readable symbology that is associated with the electronic device while the electronic device is positioned on the conveyor.

In various aspects, a method of cleaning an electronic device is provided. The method may include determining size data and/or pose data of the electronic device. The method may include engaging a first surface of the electronic device with an end effector of a first robot based on the size data or the pose data. The method may include moving the electronic device with the first robot to a first position that is proximate to a first nozzle. The method may include spraying at least a second surface of the electronic device with dry ice particles that are ejected from the first nozzle in an instance in which the electronic device is in the first position. The method may include moving the electronic device with the first robot to a second position that is proximate to the first nozzle or to a second nozzle. The method may include spraying at least a third surface of the electronic device with the dry ice particles that are ejected from the first nozzle or the second nozzle in an instance in which the electronic device is in the second position.

In various examples, in an instance in which the second surface of the electronic device is being sprayed with the dry ice particles, a predetermined angle is defined between the second surface and a path of the dry ice particles being ejected from the first nozzle.

In various examples, the method includes comprising moving the electronic device in a planar pattern with the first robot while the electronic device is being sprayed with the dry ice particles that are ejected from the first nozzle.

In various examples, the method includes engaging the electronic device with an end effector of a second robot.

In various examples, the method includes releasing the electronic device with the end effector of the first robot after engaging the electronic device with the end effector of the second robot.

In various examples, the method includes moving the electronic device with the second robot to a third position that is proximate to the second nozzle.

In various examples, the method includes spraying at least the first surface of the electronic device with the dry ice particles that are ejected from the second nozzle in an instance in which the electronic device is in the third position.

In various examples, the method includes determining size data or pose data of a second electronic device in an instance in which the electronic device is in the third position and while the electronic device is being sprayed by the second nozzle.

In various examples, the method includes engaging a second electronic device with the end effector of the first robot while the end effector of the second robot is engaging the electronic device.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
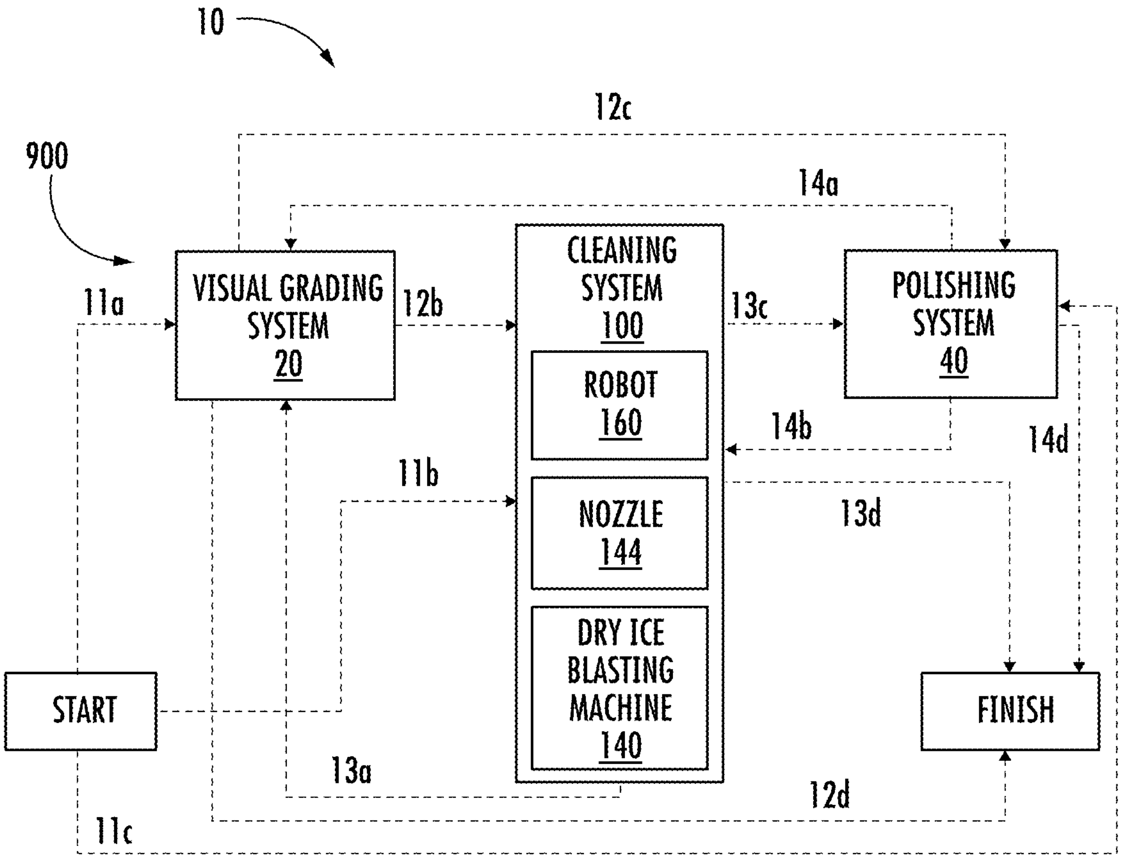

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 provides a schematic diagram of various electronic device grading workflows, in accordance with an example embodiment.

Figure 2:
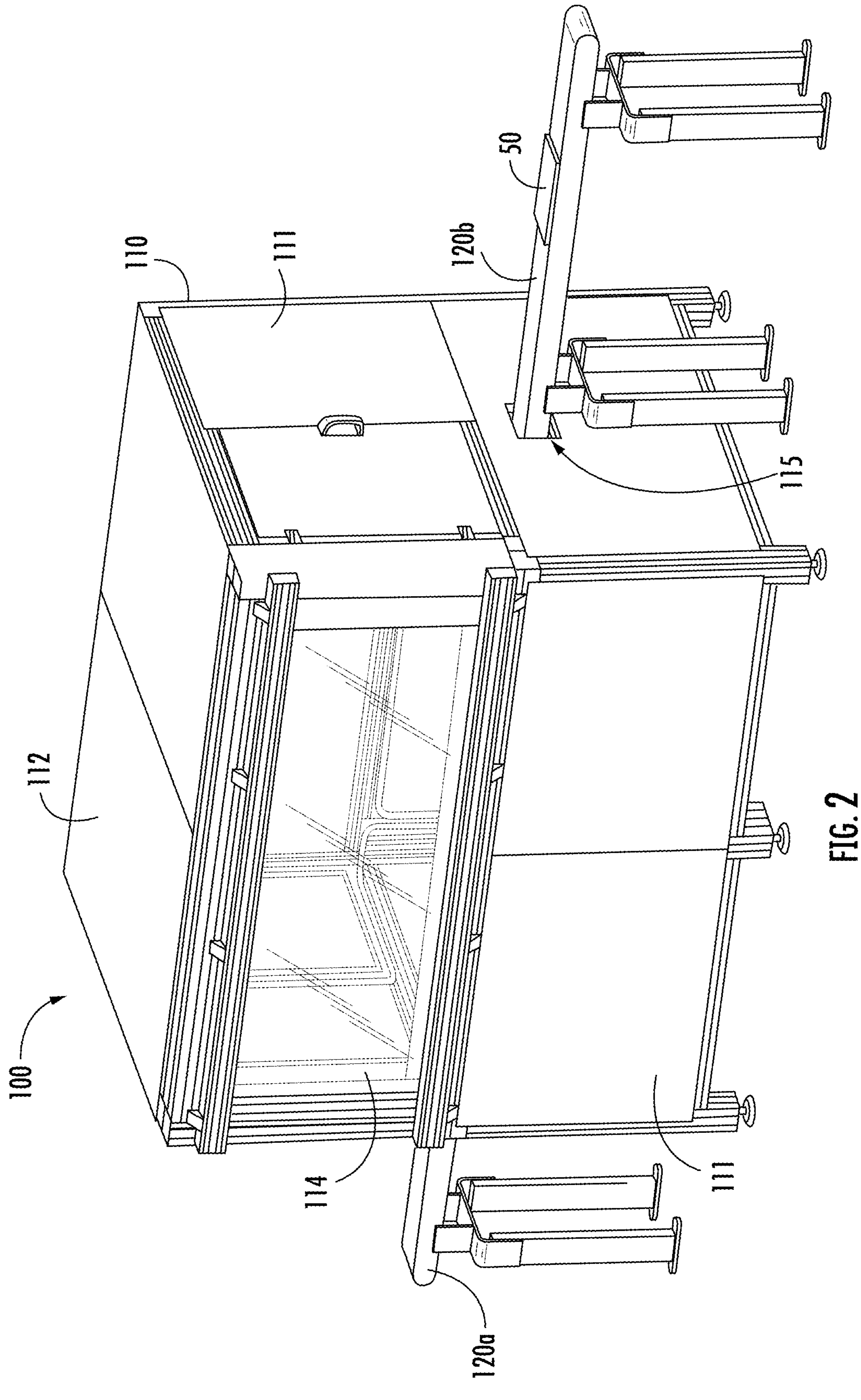
Figure 3:
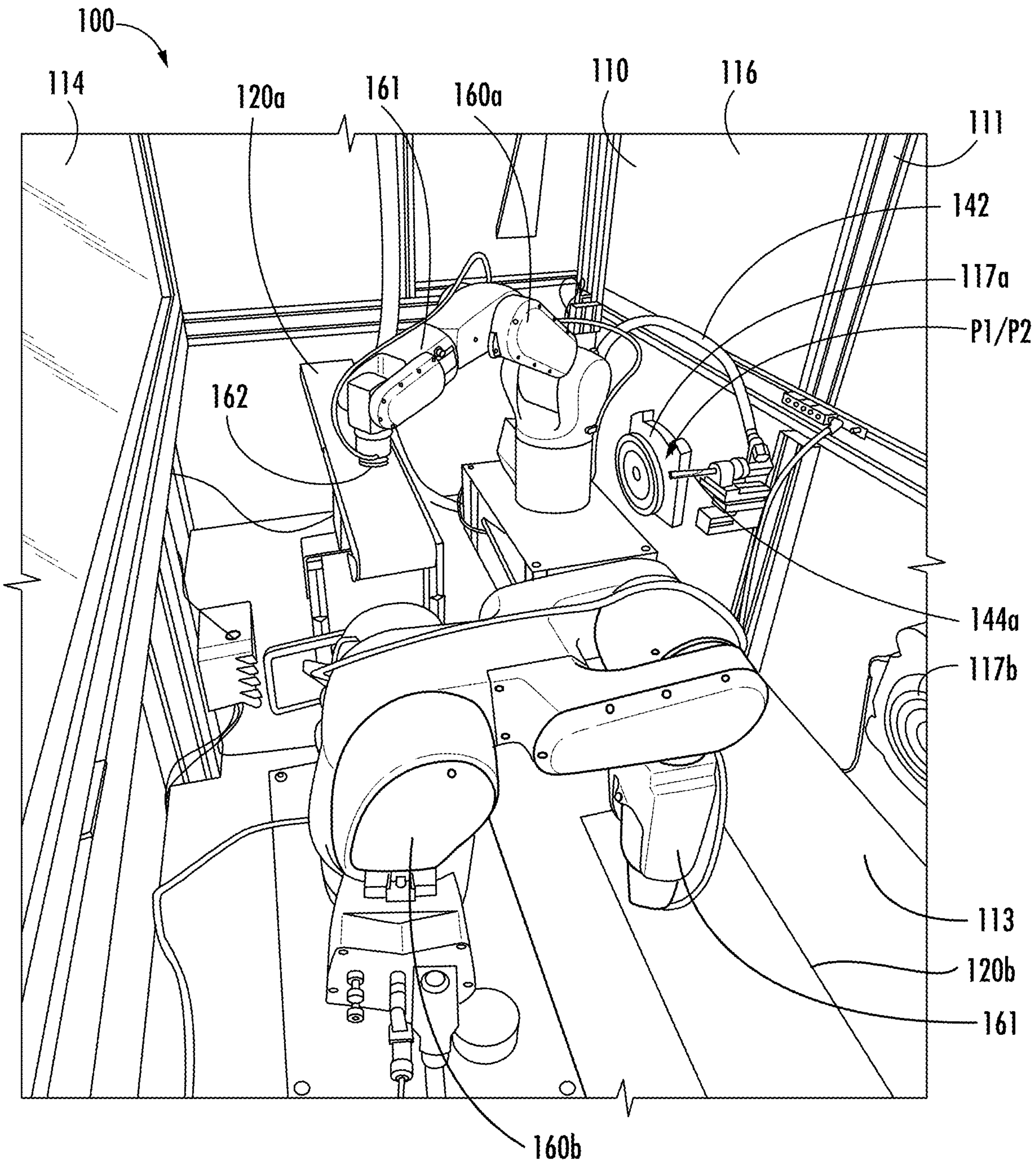
Figure 4:
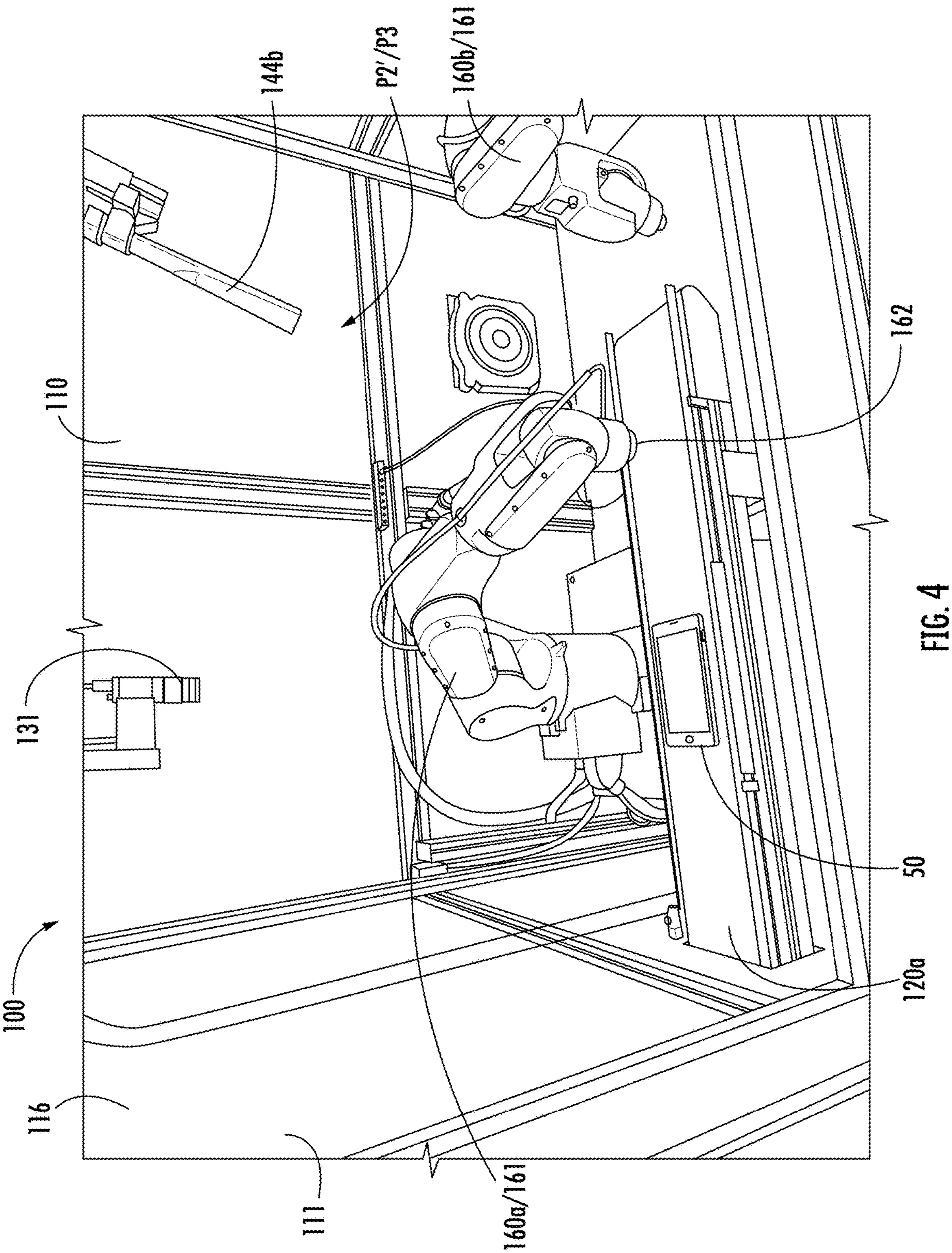
Figure 5:
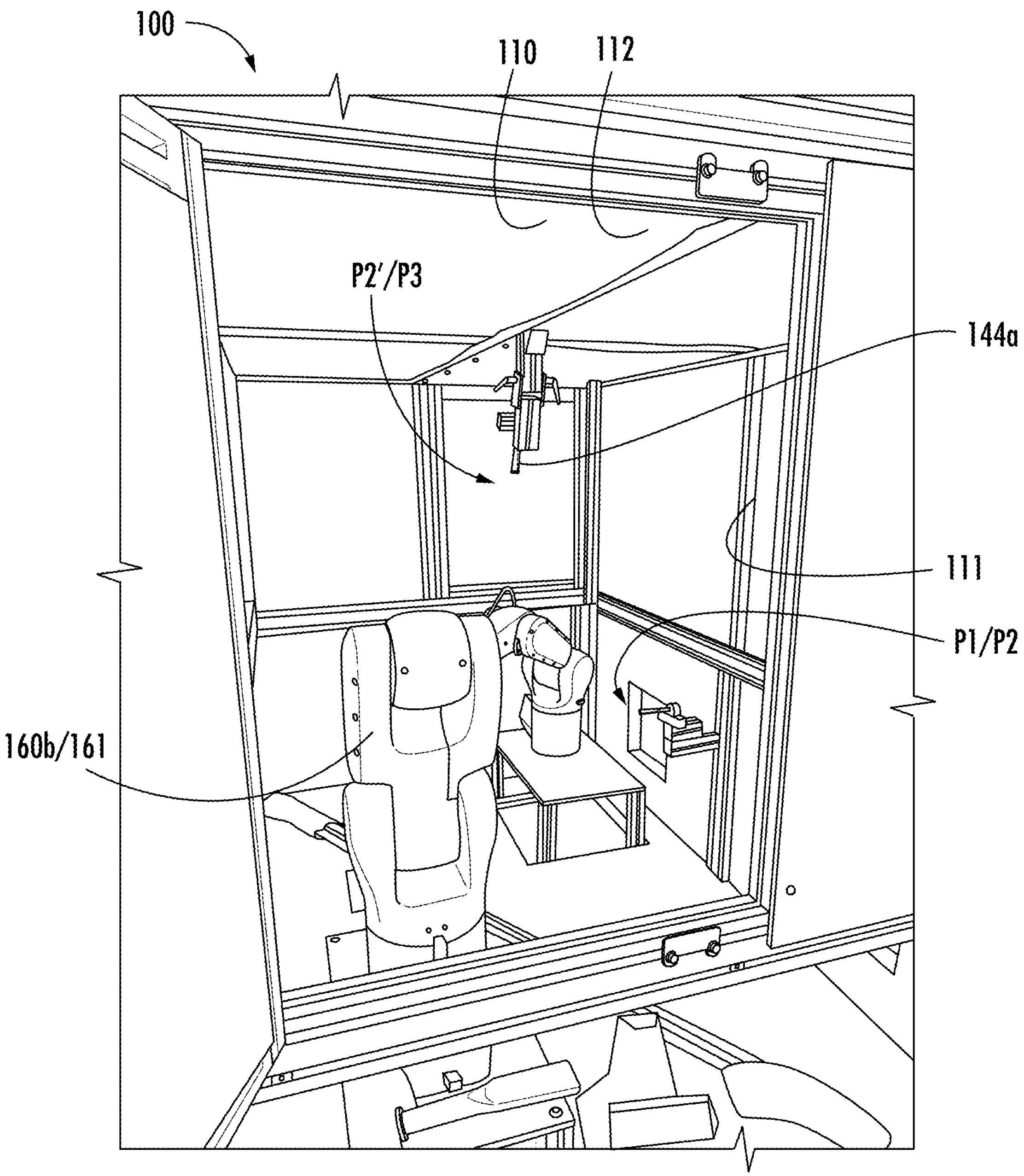
Figure 6:
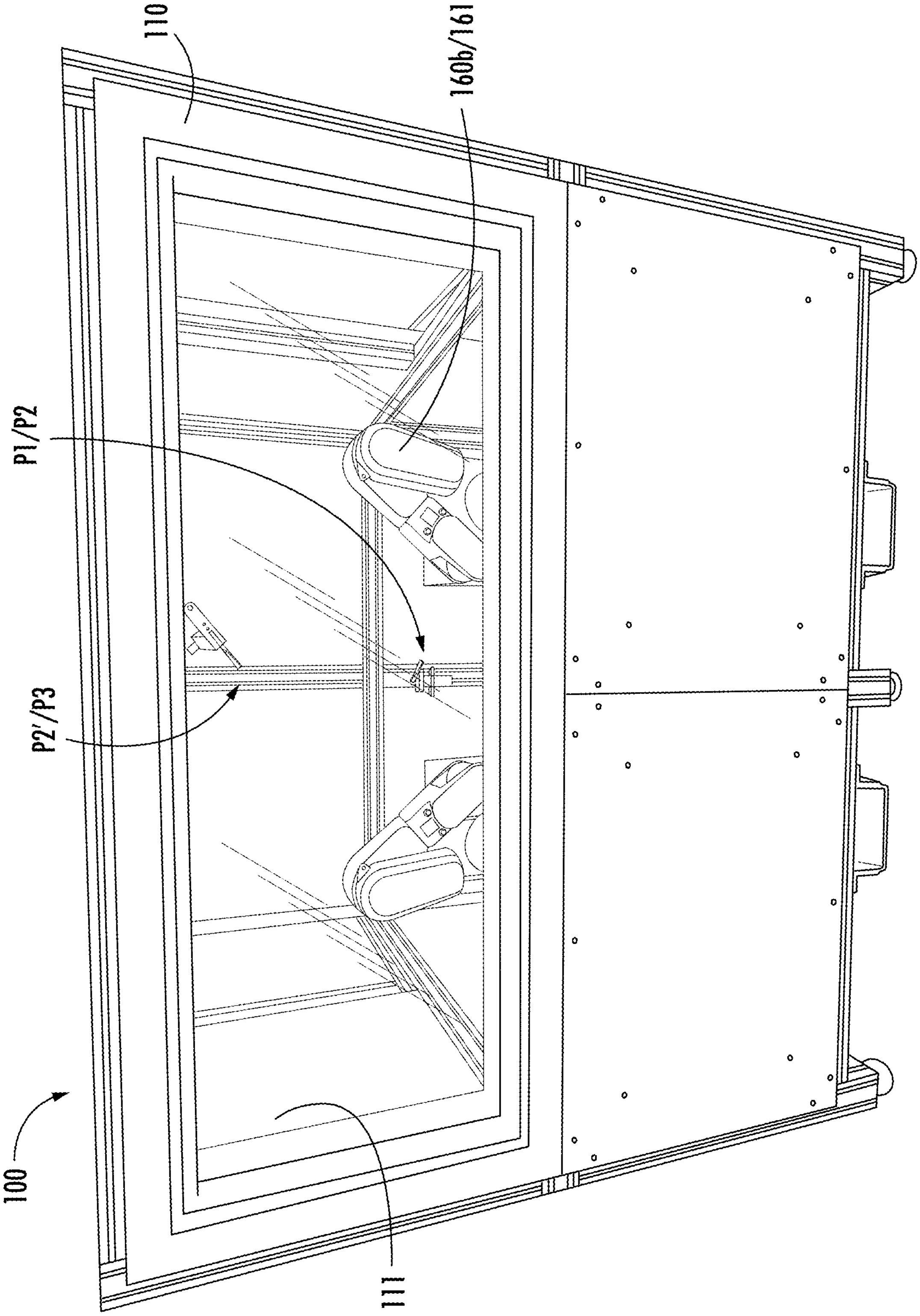

FIG. 2 provides a perspective view of at least a portion of a cleaning system, in accordance with an example embodiment.

FIGS. 3-6 provide perspective views of portions of a cleaning system, in accordance with an example embodiment.

Figure 7:
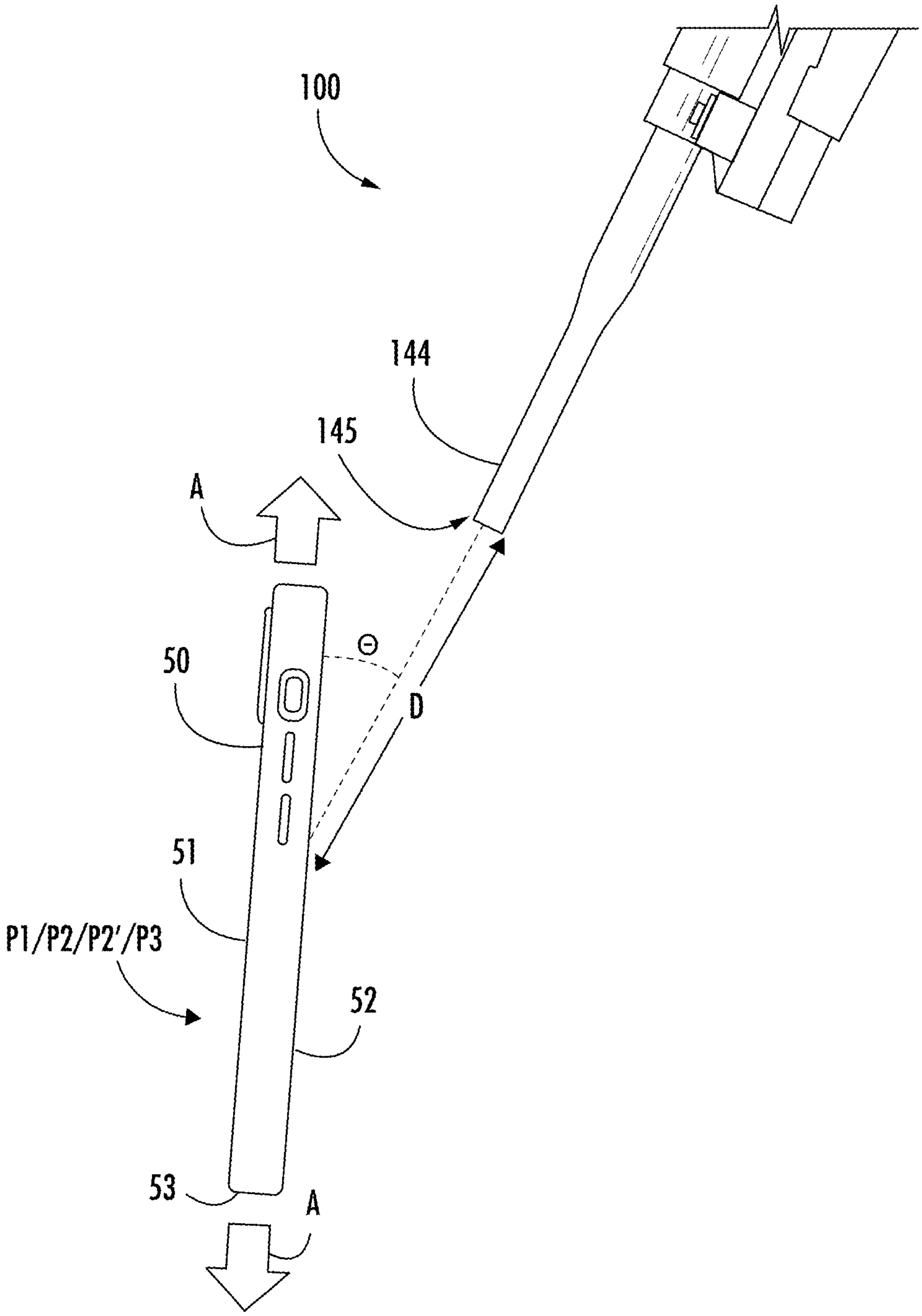

FIG. 7 provides a close-up perspective view of a nozzle of a cleaning system, in accordance with an example embodiment.

Figure 8:
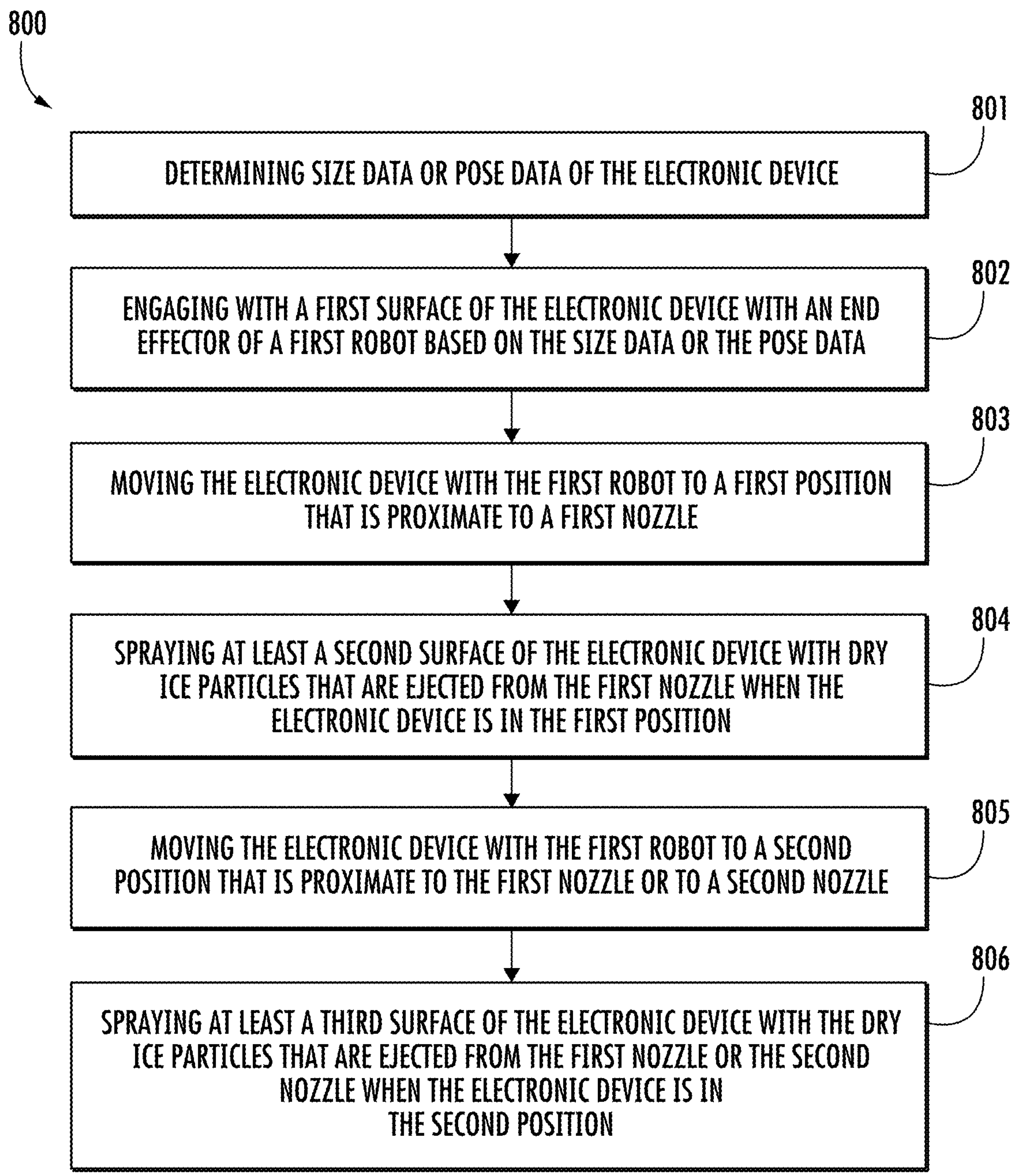

FIG. 8 provides a flow chart of a method of cleaning an electronic device, in accordance with an example embodiment.

Figure 9:
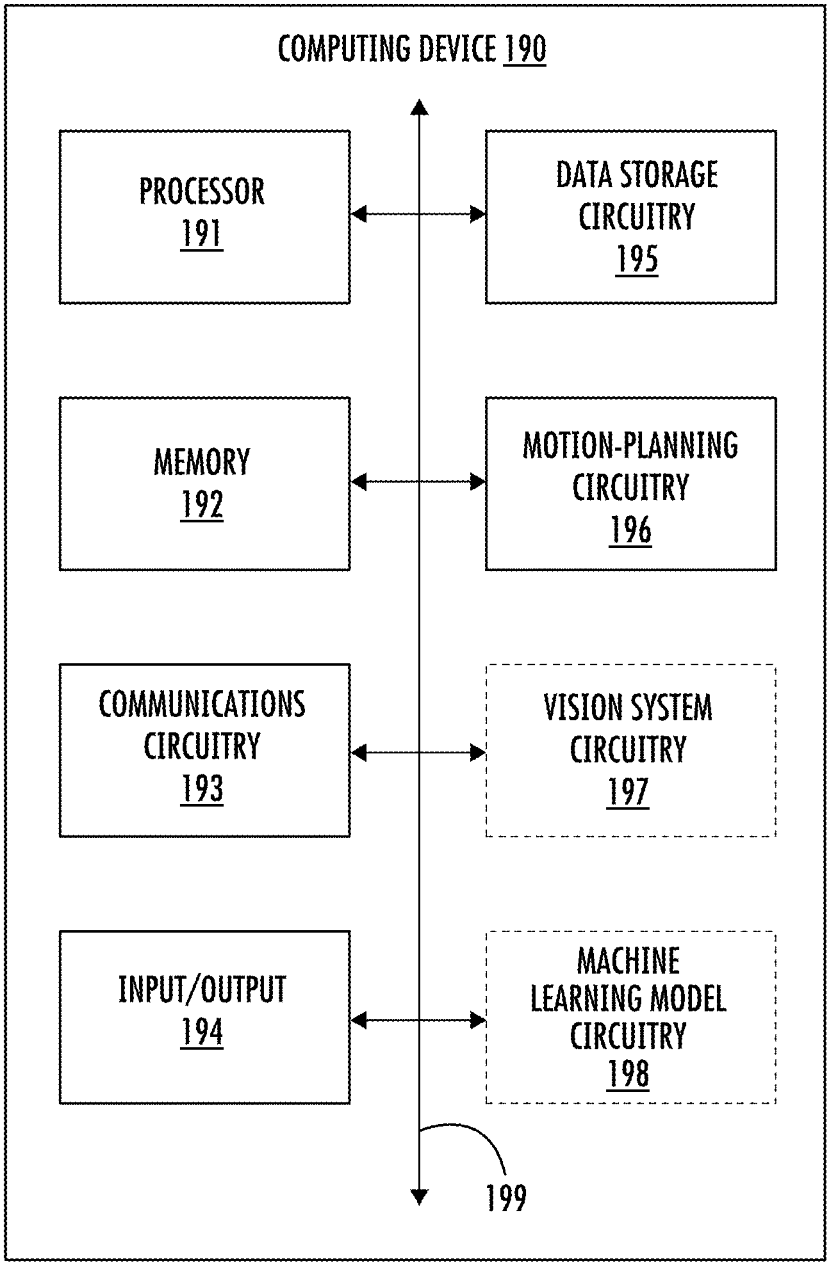

FIG. 9 provides a diagram of a cleaning system computing device, in accordance with an example embodiment.

Figure 10:
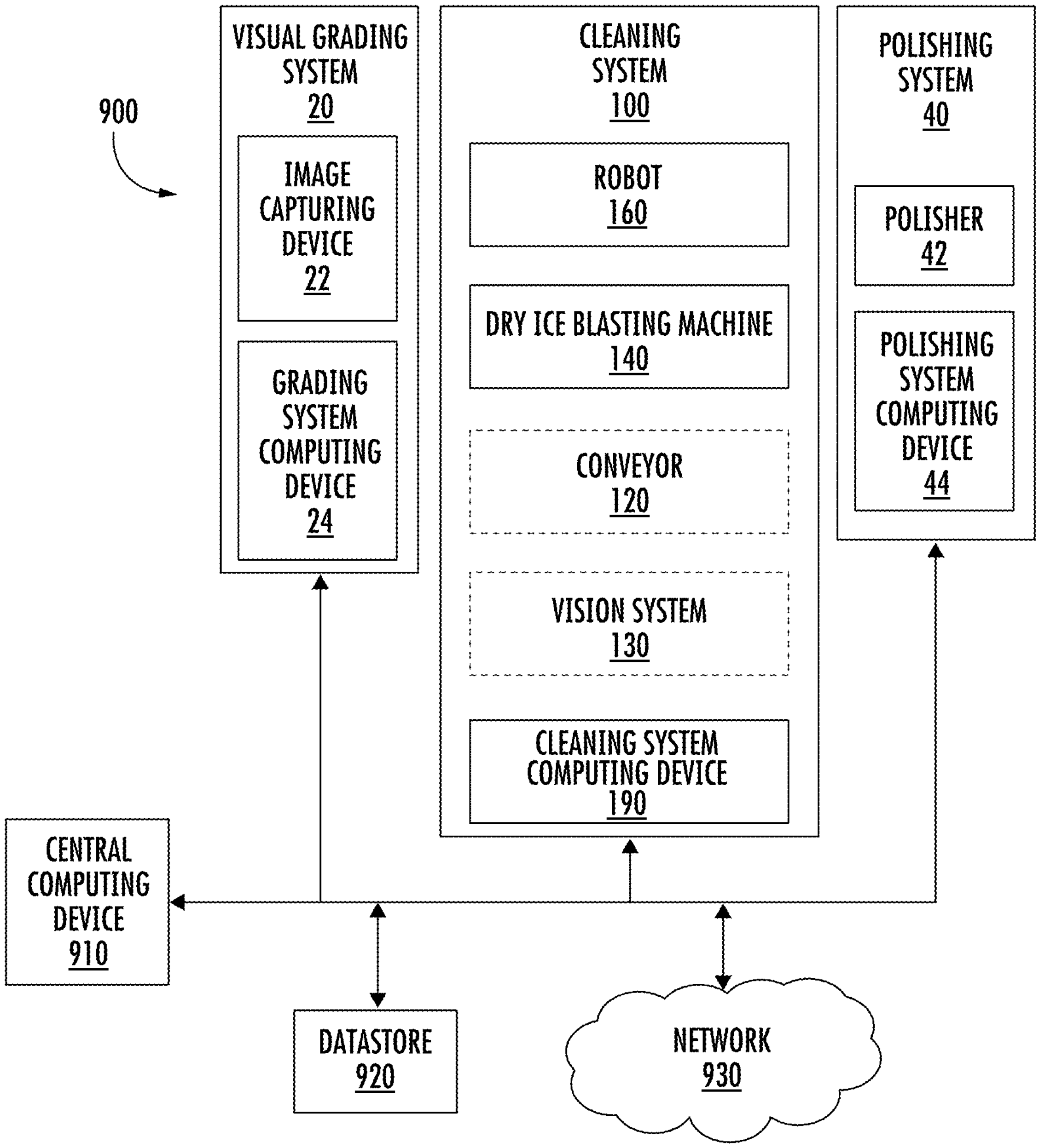

FIG. 10 provides a diagram of an electronic device grading system, in accordance with an example embodiment.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "coupled," "fixed," "attached to," and the like refer to both direct coupling, fixing, or attaching, as well as indirect coupling, fixing, or attaching through one or more intermediate components or features, unless otherwise specified herein.

The term "circuitry" should be understood broadly to include hardware and, in some examples, software for configuring the hardware. With respect to components of the apparatus, the term "circuitry" as used herein should therefore be understood to include particular hardware configured to perform the functions associated with the particular circuitry as described herein. For example, in some examples, "circuitry" may include processing circuitry, storage media, network interfaces, input/output devices, and the like.

"Executable code", "computer-coded instructions", and the like refer interchangeably to one or more portions of computer program code storable and/or stored in one or a plurality of locations that is executed and/or executable via one or more computing devices embodied in hardware, software, firmware, and/or any combination thereof. Executable code may define at least one particular operation to be executed by one or more computing devices. In some embodiments, a memory, storage, and/or other computing device includes and/or otherwise is structured to define any amount of executable code (e.g., a portion of executable code associated with a first operation and a portion of executable code associated with a second operation). Alternatively or additionally, in some embodiments, executable code is embodied by separate computing devices (e.g., a first data store embodying first portion of executable code and a second data store embodying a second portion executable code). In some embodiments, executable code requires one or more processing steps (e.g., compilation) prior to being executed by a computing device.

"Data store", "storage", "memory", and the like refer interchangeably to any type of non-transitory computer-readable storage medium. Non-limiting examples of a data store include hardware, software, firmware, and/or a combination thereof capable of storing, recording, updating, retrieving and/or deleting computer-readable data and information, whether embodied locally and/or remotely and whether embodied by a single hardware device and/or a plurality of hardware devices.

"Data object" refers to an electronically managed data structure representing a collection of one or more data attributes and/or portions of executable code "Data attribute" refers to electronically managed data representing a variable, a particular criteria, or a property having a particular value or status. The value may be statically fixed or dynamically assigned. In some embodiments, a data attribute embodies a particular property of a data object.

The term "computing device" refers to any computer, processor, circuitry, and/or other executor of computer instructions that is embodied in hardware, software, firmware, and/or any combination thereof. A computing device may enable access to a myriad of functionalities associated with one or more mobile device(s), other computing devices, system(s), and/or one or more communications networks. Non-limiting examples of a computing device include a computer, a processor, an application-specific integrated circuit, a field-programmable gate array, a personal computer, a smart phone, a laptop, a fixed terminal, a server, a networking device, and a virtual machine.

The term "electronic device" refers to any portable computing device, such as, but not limited to, a portable digital assistant (PDA), mobile telephone, smartphone, or tablet computer.

The term "mobile device" refers to any portable computing device, such as, but not limited to, a portable digital assistant (PDA), mobile telephone, smartphone, or tablet computer with one or more communications, networking, and/or interfacing capabilities. Non-limiting examples of communications, networking, and/or interfacing capabilities include CDMA, TDMA, 4G, 5G, NFC, Wi-Fi, Bluetooth, as well as hard-wired connection interfaces such as USB, Thunderbolt, and/or ethernet connections.

As used herein, terms of approximation, such as "approximately," "substantially," or "about," refer to being within manufacturing or engineering tolerances. For example, terms of approximation may refer to being within a five percent margin of error.

Exemplary Electronic Device Grading Workflows

Referring now to FIG. 1, a schematic diagram of various electronic device grading workflows 10 are provided, in accordance with an example embodiment. The electronic device grading workflow 10 represents, schematically, paths that an electronic device 50, such as a pre-owned electronic device 50, may take through an electronic device grading system 900 to determine a quality grade of the electronic device 50. The quality grade of the electronic device 50 may be used to determine whether the electronic device 50 may be sold on a secondary market and, if so, at what price. The electronic device 50 may be a mobile telephone (e.g., a smart phone), a laptop, a portable digital assistant, a tablet computer, or the like. Electronic devices 50, such as pre-owned electronic devices 50, that have a lower quality grade may include defects, such as a cracked or chipped screen, scratches to the body or the screen, damaged charging ports, etc. Electronic devices 50 with a higher quality grade may not include some or all of these defects, may have less defects, and/or the defects may be less severe.

In various examples, a visual grading system 20 may be used to determine the quality grade of the electronic device 50. The visual grading system 20 may include an image capturing device 22 (FIG. 10) that is in electrical communication with a grading system computing device 24 (FIG. 10). The image capturing device 22 may be configured to capture image data of the electronic device 50. The grading system computing device 24 may receive the captured image data from the image capturing device 22 and may subsequently determine whether the electronic device 50 has any defects based at least in part on the captured image data. The grading system computing device 24 may determine the quality grade of the electronic device 50 based at least in part on the quantity and/or severity of the defects.

In various examples, the electronic device 50 may follow a path 11*a* that goes into the visual grading system 20. If the electronic device 50 includes debris on the electronic device 50, such as lint, smudges, grease, grime, oil, dirt, etc. (e.g., inclusive of all possible debris capable of being removed with dry-ice blasting), this debris on the electronic device 50 may cause the visual grading system 20 to erroneously detect a defect or incorrectly assess the severity of a defect. As such, it may be beneficial for the electronic device 50 to be cleaned prior to entering the visual grading system 20. Cleaning the electronic device 50 prior to entering the visual grading system 20 may increase the accuracy of the visual grading system 20.

In various examples, the electronic device 50 may follow a path 11*b* that goes into a cleaning system 100, which may be configured to clean the electronic device 50. As will be discussed further, the cleaning system 100 may include at least one robot 160, at least one nozzle 144, and at least one dry ice blasting machine 140. The cleaning system 100 may remove all, most, or some of the debris from the electronic device 50. After the electronic device 50 is cleaned by the cleaning system 100, the electronic device 50 may follow a path 13*a* from the cleaning system 100 and into the visual grading system 20 to determine the quality grade of the electronic device 50 (e.g., the quality grade may be improved if the electronic device 50 is cleaner).

In various examples, the electronic device 50 may include scratches on the screen or on the body (e.g., a glass body) of the electronic device 50. The scratches may, in some examples, be removed by polishing. In various examples, the scratches may be detected by the visual grading system 20. After the scratches are detected by the visual grading system 20, the electronic device 50 may follow a path 12*c* from the visual grading system 20 and to the polishing system 40. In various examples, the electronic device 50 initially bypasses the visual grading system 20 and follows a path 11*c* to the polishing system 40, which may be configured to polish the electronic device 50.

After the electronic device 50 has been polished by the polishing system 40, the electronic device 50 may follow a path 14*a* from the polishing system 40 and to the visual grading system 20. In various examples, it may be beneficial to clean the electronic device 50 after it has been polished to remove any debris from the electronic device 50, including any polishing substances that may remain on the electronic device 50 after being polished by the polishing system 40. The electronic device 50 may follow a path 14*b* from the polishing system 40 to the cleaning system 100, to be cleaned, and a path 13*a* from the cleaning system 100 and to the visual grading system 20 to determine a quality grade.

In various examples, the electronic device 50 may bypass the cleaning system 100, the polishing system 40, or both. For example, the electronic device 50 may follow path 11*a* to the visual grading system 20. The visual grading system 20 may be configured to detect grime on the electronic device 50, scratches on the electronic device 50, or both. If the visual grading system 20 determines that the electronic device 50 does not have grime and does not have scratches, or if the severity or quantity of the grime and/or scratches is below a threshold value, the electronic device 50 may follow a path 12*d* to finish the electronic device grading workflow 10. In some embodiments, one or more of the visual grading, the cleaning, and/or the polishing may be default steps not requiring a detection of a trigger condition.

If the visual grading system 20 determines that the electronic device 50 has grime and has scratches, or if the severity or quantity of the grime and scratches exceeds a threshold value, the electronic device 50 may follow a path 12*b* from the visual grading system 20 and to the cleaning system 100 to be cleaned, and then the electronic device 50 may follow a path 13*c* from the cleaning system 100 to the polishing system 40. After the electronic device 50 is polished by the polishing system 40, the electronic device 50 may take path 14*a* to the visual grading system 20 to determine the quality grade. Once the visual grading system 20 determines the quality grade of the electronic device 50, the electronic device 50 may follow path 12*d* to finish the electronic device grading workflow 10.

If the visual grading system 20 determines that the electronic device 50 has grime and has no scratches, or if the severity or quantity of the grime exceeds a threshold value and the severity or quantity of the scratches is below a threshold value, the electronic device 50 may follow a path 12*b* from the visual grading system 20 to the cleaning system 100. After the electronic device 50 is cleaned, the electronic device 50 may follow a path 13*a* from the cleaning system 100 to the visual grading system 20 to determine a quality grade of the electronic device 50. Once the visual grading system 20 determines the quality grade of the electronic device 50, the electronic device 50 may follow path 12*d* to finish the electronic device grading workflow 10.

In various examples, the electronic device 50 may be cleaned by the cleaning system 100, polished by the polishing system 40, or both, after the visual grading system 20 has determined a quality grade of the electronic device 50. After a quality grade has been determined for the electronic device 50, the electronic device 50 may be cleaned by the cleaning system 100 and, subsequently, the electronic device 50 may follow a path 13*d* to finish the electronic device grading workflow 10. After a quality grade has been determined for the electronic device 50, the electronic device 50 may be polished by the polishing system 40 and, subsequently, the electronic device 50 may follow a path 14*d* to finish the electronic device grading workflow 10. In various embodiments, cleaning may be performed before visual grading and/or after polishing. In various embodiments, polishing may be performed after and/or before cleaning (e.g., pre-polishing to remove debris to avoid further scratching or contamination when using a polishing head and/or post-polishing to remove the polishing compound residue). In various embodiments, polishing may be performed before visual grading. Even though only a few of the potential combination of paths 11*a*-14*d* have been discussed, other various combinations of paths 11*a*-14*d* may be taken by the electronic device 50 to finish the electronic device grading workflow 10.

Exemplary Cleaning Systems

Referring now to FIG. 2, a perspective view of at least a portion of a cleaning system 100 is provided, in accordance with an example embodiment. The cleaning system 100 may include an enclosure 110. The enclosure 110 may include a plurality of walls 111 and a ceiling 112. The enclosure 110 may include a floor 113 (FIG. 3) and/or a window 114. The enclosure 110 may generally define a rectangular prism shape.

At least one of the walls 111 of the enclosure 110 may define at least one opening 115. Each of the at least one opening 115 may be sized to allow for the electronic device 50 to be fed from a position exterior to the enclosure 110 to a position interior to the enclosure 110. For example, each of the openings 115 may be a slot that has a dimension that is less six inches, such as less than three inches, such as less than one inch.

In various examples, the cleaning system 100 includes at least one conveyor 120. For example, the cleaning system 100 may include at least an infeed conveyor 120*a* and an outfeed conveyor 120*b*. In various examples, at least one conveyor 120 may extend through the opening 115 and may be positioned at least partially within the enclosure 110. In various examples, at least one of the openings 115 may be sized so that at least a portion of at least one conveyor 120 and the electronic device 50 may be positioned within the opening 115. For example, at least one of the openings 115 through which at least one conveyor 120 extends may have a dimension that is at least six inches and up to two feet, such as at least six inches and up to one foot.

Each infeed conveyor 120*a* may be configured to convey at least one electronic device 50 from a position that is exterior to the enclosure 110 to a position that is interior to the enclosure 110. Each outfeed conveyor 120*b* may be configured to convey at least one electronic device 50 from a position that is interior to the enclosure 110 to a position that is exterior to the enclosure 110.

Referring now to FIGS. 3-7, various perspective views of a cleaning system 100 are provided, in accordance with an example embodiment. In various examples, the enclosure 110 includes acoustic panels 116 that may be positioned within the enclosure 110 and coupled to the walls 111, the ceiling 112, and/or the floor 113 of the enclosure 110. The acoustic panels 116 may dampen sound emitted by components within the enclosure 110, such as the sound emitted by dry ice particles being ejected from at least one nozzle 144, which will be discussed in more detail.

In various examples, the acoustic panels 116 may be configured and/or arranged to reduce the sound level experienced by an individual positioned proximate to, but exterior to, the enclosure 110 by at least 30 decibels, such as by at least 40 decibels. For example, the sound emitted by the cleaning system 100 when the cleaning system does not include the acoustic panels 116 may be approximately 120 decibels. The sound emitted by the cleaning system 100 when the cleaning system includes the acoustic panels 116 may be approximately 80 decibels. As will be appreciated, incorporating the acoustic panels may reduce sound levels to below a level required by government regulations. Therefore, when acoustic panels 116 are incorporated, the cleaning system 10 may be installed where individuals are present.

In various examples, the cleaning system 100 may include at least one fan 117. Each of the at least one fan 117 may be positioned within an opening in at least one of the walls 111, the ceiling 112, or the floor 113 of the enclosure 110. For example, an intake fan 117*a* and an exhaust fan 117*b* may be positioned within a respective opening of a wall 111. The intake fan 117*a* may be configured to suck air into the enclosure 110 and the exhaust fan 117*b* may be configured to push air out of the enclosure 110. The at least one fan 117 may provide ventilation within the enclosure 110 to maintain an ambient temperature. The at least one fan 117 may include a carbon filter to remove debris from the air before the air is exhausted by the at least one fan 117 (e.g., debris removed by the dry ice).

In various examples, the cleaning system 100 may include at least one vision system 130 (FIG. 10). At least one vision system 130 may be configured to capture image data. For example, at least one vision system 130 may include an image capturing device 131, such as a camera, such as a photographic camera, a LIDAR camera, or an infrared camera, and may be configured to capture image data, such as a photograph, of the electronic device 50. The image capturing device 131 of the at least one vision system 130 may be coupled to a ceiling 112 of the enclosure 110. The image capturing device 131 of the at least one vision system 130 may be configured to capture image data of the electronic device 50 while the electronic device 50 is positioned on the at least one conveyor 120, such as on the infeed conveyor 120*a*.

The at least one vision system 130 may include at least one processor that is configured to analyze the captured image data to determine size data and/or pose data of the electronic device 50. The size data may include data indicative of at least one dimension of the electronic device 50. For example, the size data may include data indicative of at least one of a length, a width, a height, and/or a center point of at least one surface of the electronic device 50. The pose data may include data indicative of an orientation of the device, a position of the device, or both. As will be explained further, the at least one vision system 130 may be configured to transmit the size data and/or the pose data for the electronic device 50 to at least one robot 160.

In various examples, at least one vision system 130 may be configured to read machine-readable symbology, such as a quick-response (QR) code or a bar code, that is associated with the electronic device 50. For example, the at least one vision system 130 may include an image capturing device 131 or another dedicated scanner that is configured to read the machine-readable symbology. The image capturing device may be the same image capturing device or a different image capturing device than the image capturing device 131 that may be configured to capture image data. The machine-readable symbology that is associated with the electronic device 50 may be included (e.g., printed) on a sticker that is adhered to the electronic device 50.

The machine-readable symbology may be used by the various systems that are associated with the electronic device grading workflow 10, such as the visual grading system 20, the cleaning system 100, the polishing system 40, or a combination thereof. For example, the machine-readable symbology may be read by a corresponding vision system of the visual grading system 20, the cleaning system 100, the polishing system 40, or a combination thereof. Based on the machine-readable symbology, the electronic device 50 may be identified and tracked as it flows through the various paths 11*a*-14*d* of the electronic device grading workflow 10.

In various examples, the cleaning system 100 may remove the machine-readable symbology that is associated with the electronic device 50 that is being cleaned. As such, it may be beneficial to read the machine-readable symbology prior to the electronic device 50 being cleaned so that the electronic device 50 may be identified. Also, it may be beneficial to reapply the machine-readable symbology after the electronic device 50 has been cleaned (e.g., via a robot arm, dedicated sticker machine, or the like). In some embodiments, the reapplied machine-readable symbology may be identical to the symbology originally scanned by the at least one vision system. In various examples the cleaning system 100 may include a printer. The printer may be configured to receive the read machine-readable symbology from the vision system 130 and print the machine-readable symbology on media, such as a label or a sticker. The media with the machine-readable symbology may then be reassociated with the electronic device 50, such as adhered to the electronic device 50, so that the electronic device 50 may be tracked as it traverses through the electronic device grading workflow 10.

In various example, the cleaning system 100 includes at least one dry ice blasting machine 140 (FIG. 10). The dry ice blasting machine 140 may be configured to eject particles of dry ice (i.e., the solid form of carbon dioxide). For example, the at least one dry ice blasting machine 140 may be configured to produce a pressure of at least 70 psi, such as at least 70 psi and up to 100 psi, such as at least 75 psi and up to 90 psi, such as at least 80 psi and up to 85 psi to eject the dry ice particles. The at least one dry ice blasting machine 140 may be configured to blast dry ice particles that have a size that is approximately 1.3 pcs (particle control system), such as at least 1 pcs and up to 1.5 pcs. In various examples, the dry ice particles may have a size that is less than 3 millimeter (mm), such as less than 2 mm, such as less than 1 mm, such as less than 0.5 mm.

The at least one dry ice blasting machine 140 may be coupled to at least one hose 142 to direct the dry ice particles to a nozzle 144 that is coupled to the hose 142. The nozzle 144 may have a nozzle opening 145 that the dry ice particles are ejected from. The at least one dry ice blasting machine 140, the hose 142, and the nozzle 144 may be fluidically connected with each other such that the dry ice particles ejected from the dry ice blasting machine 140 are subsequently ejected from the nozzle opening 145 of the nozzle 144.

The at least one dry ice blasting machine 140 may be positioned exterior to the enclosure 110 and fluidically connected to at least one nozzle 144 positioned within the enclosure 110. In various examples, a dry ice blasting machine 140 may be fluidically coupled to two or more nozzles 144 via at least two hoses and a hose 142 diverter (not depicted). The hose 142 diverter may include valves to selectively divert the dry ice particles from a dry ice blasting machine 140 to a selected one of the two or more nozzles, two of the two or more nozzles, three of the two or more nozzles, etc. In some embodiments, the at least one dry ice blasting machine 140 may be positioned within the enclosure.

In various examples, at least one nozzle 144 may be positioned within the enclosure 110 and on a wall 111 of the enclosure 110. At least one nozzle 144 may be positioned within the enclosure 110 and on a ceiling 112 of the enclosure 110. For example, the cleaning system 100 may include a first nozzle 144*a* that is coupled to the wall 111 of the enclosure 110 and a second nozzle 144*b* (FIG. 4) that is coupled to the ceiling 112 of the enclosure 110, or vice-versa. Each nozzle 144 may be coupled to the enclosure 110 with a pivoting device that allows the adjustment of the angle of the nozzle 144 relative to the enclosure 110 prior to operation of the cleaning system 100. Each nozzle 144 may be firmly coupled, via the pivoting device or any other coupling device, to the enclosure 110 so that the nozzle 144 does not significantly move (e.g., movement other than vibrational movement) relative to the enclosure 110 when the cleaning system 100 is operating.

In various examples, the cleaning system 100 includes at least one robot 160 positioned within the enclosure 110. For example, the cleaning system 100 may include at least a first robot 160*a* and a second robot 160*b*. Each robot 160 may include a robot arm 161 and an end effector 162 coupled to the robot arm 161. In various examples, the end effector 162 of the at least one robot 160 may include at least one suction cup, a pneumatic gripper, an electric gripper, a mechanical gripper, or a combination thereof.

Each robot 160 may include various components, such as a controllable vacuum source that may exert a negative pressure to allow at least one suction cup, when included on the end effector 162, to adhere to the electronic device 50. The at least one suction cup, when included, may be any device or object that uses negative fluid pressure to adhere to a nonporous surface, such as the body of the electronic device 50.

Each robot 160 may be a mechanical manipulation device capable of engaging an electronic device 50 and manipulating the electronic device 50 by translating, rotating, and/or otherwise moving the electronic device 50 with respect to one or more axes. Each robot may be a multi-axis robot (e.g., a six-axis robot arm). In some embodiments, the robot 160 may be configured to operably engage the electronic device 50 with the end effector to facilitate the execution of cleaning operations. In some embodiments, the robot 160 may be configured to temporarily and non-destructively engage the electronic device 50.

Each of the at least one robot 160 may be positioned near a corresponding conveyor 120. For example, a first robot 160*a* may be positioned near an infeed conveyor 120*a* and a second robot 160*b* may be positioned near an outfeed conveyor 120*b*. As will be explained further, each robot 160 may be configured to engage with an electronic device 50 that is positioned on a corresponding conveyor 120. For example, each robot 160 may be configured to engage and pick up an electronic device 50 that is positioned on a corresponding conveyor 120. Each robot 160, via the end effector and/or the robot arm 161, may be configured to move the electronic device 50 with six degrees of freedom.

Each of the at least one robot 160 may be configured to receive the size data and/or the pose data that is determined by the at least one vision system 130. The at least one robot 160 may use the size data and/or the pose data to engage with the electronic device 50. For example, the at least one robot 160 that is positioned near the electronic device 50 may use the size data and/or the pose data to determine a movement of the corresponding robot arm 161, the end effector, or both, to engage and pick up the electronic device 50. In various examples, the movement of the robot 160 may be determined by the cleaning system computing device 190 or a central computing device 910 (FIG. 10). In various examples, the movement of the robot 160 may be determined by a programmable logic controller (PLC) that is positioned on the robot 160.

When the end effector includes a suction cup, the at least one robot 160 may use the size data and/or the pose data to determine a position of the suction cup to engage with (e.g., make contact with and apply suction to) a center of a first surface 51 (FIG. 7) of the electronic device 50. The first surface 51 of the electronic device 50 may be an upward-facing surface of the electronic device 50 while the electronic device 50 is positioned on the infeed conveyor 120*a*. In various examples, the first surface 51 is a front of the electronic device 50 or the back of the electronic device 50. The electronic device 50 may define a second surface 52 that is opposite to the first surface 51, such as the other of the front of the electronic device 50 or the back of the electronic device 50. The electronic device 50 may define a third surface 53 that may be any surface that extends between the first surface 51 and the second surface 52 of the device, such as four edges of the electronic device 50. The third surface 53 may define a thickness of the electronic device 50. For example, in some embodiments, at least one of the nozzles 144 may be configured to clean one or more of the edges (e.g., third surface) of the device. In such embodiments, the robot 160 may be configured to rotate and/or translate the edge of the electronic device 50 adjacent to the at least one nozzle 144 to deliver the dry ice particles at a predetermined distance and/or predetermined angle consistently along the edge of the device. Example robot arm movement processes that may be adapted to positioning an electronic device 50 for cleaning are described in the U.S. application bearing 63/614,938, which application is incorporated by reference herein in its entirety.

At least the first robot 160*a*, which may be positioned near the infeed conveyor 120*a*, may engage the electronic device 50 while the electronic device 50 is positioned on the infeed conveyor 120*a* and move the electronic device 50 to a first position P1. As will be explained further, the at least one robot 160 may be configured to move the electronic device 50 in a plurality of different positions that are proximate to a respective nozzle 144, such as a first position P1, a second position P2, and a third position P3. The first position P1 may be proximate to the first nozzle 144*a*. In various examples, the second position P2, P2' may be proximate to the first nozzle 144*a* (indicated as P2) or a second nozzle 144*b* (indicated as P2'). The third position P3 may be proximate to the second nozzle 144*b*. In various embodiments, the robot(s) may be configured to position every surface of the electronic device in a cleaning position (e.g., a predetermined distance and/or angle) from at least one nozzle during operation of the at least one dry ice machine to clean the entire device.

With reference to FIG. 7, a close-up view of an electronic device 50 in one of the plurality of positions is provided, in accordance with an example embodiment. When the electronic device 50 is in one of the plurality of positions (e.g., positions P1, P2, P2', or P3), a predetermined distance D may be defined between the nozzle opening 145 and a surface of the electronic device 50 that is to be sprayed by the respective nozzle 144, such as the second surface 52, as depicted. The distance D may be less than 200 mm, such as at least 125 mm and up to 200 mm, such as at least 150 mm and up to 200 mm, such as at least 150 mm and up to 175 mm. In some embodiments, the predetermined distance D may encompass a range or tolerance around a specific distance.

Still referring to FIG. 7, a predetermined angle Θ may be defined between the surface of the electronic device 50 to be sprayed, such as second surface 52, as depicted, and a path of the dry ice particles to be ejected from the respective nozzle 144 when the electronic device 50 is in one of the plurality of positions. The angle Θ may be at least 10 degrees and up to 45 degrees, such as at least 20 degrees and up to 35 degrees, such as at least 25 degrees and up to 30 degrees. In some embodiments, the predetermined angle Θ may encompass a range or tolerance around a specific angle.

In various examples, the at least one robot 160 may be configured to maintain the distance D within a distance D tolerance and/or the angle Θ within an angle Θ tolerance while the electronic device 50 is in the respective position and when the dry ice particles are being ejected from the respective nozzle 144. In various examples, the distance D tolerance may be less than 20 mm, such as less than 10 mm, such as less than 5 mm. The angle Θ tolerance may be less than 10 degrees, such as less than 5 degrees, such as less than 2 degrees.

Maintaining the distance D within a distance D tolerance while the electronic device 50 is in the respective position and when the dry ice particles are being ejected from the respective nozzle 144 has various benefits. As will be appreciated in light of the present disclosure, the velocity at which the dry ice particles are ejected from the respective nozzle 144 reduces as the particles move further away from the respective nozzle opening 145. As such, if the electronic device 50 is positioned closer than the distance D, the surface of the electronic device 50 may be removed, such as a portion of a coating or a substrate of the electronic device 50, because of the excess velocity of the dry ice particles. In contrast, if the electronic device 50 is positioned further away than the distance D, the velocity of the dry ice particles may be too low to sufficiently remove any debris from the electronic device 50.

Maintaining the angle Θ within an angle Θ tolerance while the electronic device 50 is in the respective position and when the dry ice particles are being ejected from the respective nozzle 144 has various benefits. As will be appreciated, the angle Θ of the dry ice particles being ejected from the respective nozzle 144 corresponds to an "angle of attack" respective to any debris that may be on the electronic device 50. An angle Θ of at least 10 degrees and up to 45 degrees, such as at least 20 degrees and up to 35 degrees, such as at least 25 degrees and up to 30 degrees may maximize the amount of debris that is removed from the electronic device 50.

In various examples, the at least one robot 160 may move the electronic device 50 in a planar pattern while the electronic device 50 is being sprayed with the dry ice particles that are ejected from the respective nozzle 144. For example, the at least one robot 160 may move the electronic device 50 in any direction that is parallel to the surface of the electronic device 50 that is being sprayed, such as the directions indicated by arrows A, the directions in and out of the page, or a combination thereof. For transitioning between surfaces (e.g., between a front or rear surface and an edge, or between edges), the robot may be configured to rotate the electronic device about a center of curvature of the transition between the surfaces to maintain consistent cleaning during the transition.

In various examples, the at least one robot 160 may move the electronic device 50 in the planar pattern while maintaining the distance D and/or the angle Θ within the respective tolerance while the electronic device 50 is being sprayed with the dry ice particles that are ejected from the respective nozzle 144. The at least one robot 160 may move the electronic device 50 in the planar pattern to maximize the surface area that is cleaned by dry ice particles being ejected from the respective nozzle 144, which collide with the surface to be cleaned (e.g., second surface 52, as depicted in FIG. 7). In some embodiments, the planar pattern may be used for the front and/or rear surfaces of the electronic device and an edge-following pattern may be used for the edge surfaces of the electronic device. The edge-following pattern may comprise translational movement along the lengths of the edges connected by rotational movement about the center of rotation of the device corners to clean circumferentially around the edges of the electronic devices.

In various example, the at least one robot 160, such as the first robot 160*a*, may move the electronic device 50 to a second position P2, P2', which may be proximate to the first nozzle 144*a* (indicated as P2) or the second nozzle 144*b* (indicated as P2'). The at least one robot 160 may move the electronic device 50 to the second position P2 to clean the third surface 53 of the electronic device 50. The third surface 53 of the electronic device 50 may be the four edges of the electronic device 50. When the end effector 162 is configured to include one or more suction cups, the end effector 162 of the at least one robot 160 may not block or interfere with the cleaning of the third surface 53 of the electronic device 50. For example, the suction cups of the end effector 162 may be wholly positioned on the first surface 51, which may allow all surfaces of the third surface 53 to be cleaned.

Once the electronic device 50 is in the second position P2 and being sprayed by dry ice particles, the at least one robot 160 may move the electronic device 50 in the planar pattern while maintaining the distance D and/or the angle Θ within the tolerances while the electronic device 50 is being sprayed with the dry ice particles that are ejected from the first nozzle 144*a* or the second nozzle 144*b*. When the third surface 53 is an edge or a side of the device, the at least one robot 160 may rotate the electronic device 50, while also maintaining the distance D and/or the angle Θ within the respective tolerances so that all four edges of the electronic device 50 may be cleaned.

In various examples, another robot 160, such as a second robot 160*b* may engage with the electronic device 50 while the first robot 160*a* is still engaged with the electronic device 50 (e.g., a mid-air hand-off). For example, while the first robot 160*a* is engaged with the first surface 51 of the electronic device 50, the second robot 160*b* may engage the second surface 52, which may be a surface opposite to the first surface 51. Once the second robot 160*b* has engaged with the second surface 52, the first robot 160*a* may disengage (e.g., let go of) the electronic device 50. Stated differently, the first robot 160*a* may "hand-off" the electronic device 50 to the second robot 160*b*.

Handing-off the electronic device 50 from the first robot 160*a* to the second robot 160*b* has various benefits. For example, because the first robot 160*a* is engaged with the first surface 51 of the device, portions of the first surface 51 may not be able to be cleaned by the dry ice particles while the first robot 160*a* is engaged with the first surface 51. Therefore, it may be beneficial for the second robot 160*b* to engage with the second surface 52 so that the first robot 160*a* may disengage with the first surface 51 and the first surface 51 may be cleaned. Notably, the first surface 51 may be cleaned in this scenario without the first robot 160*a* putting the electronic device 50 down and re-engaging with the electronic device 50.

Additionally, handing-off the electronic device 50 from the first robot 160*a* to the second robot 160*b* may allow the second robot 160*b* to finish the cleaning of the electronic device 50 while the first robot 160*a* performs other tasks, such as engaging with a second device that may be positioned on the infeed conveyor 120*a*. Also, the first robot 160*a* may have a limited reach, which is determined by a length of the robot arm 161 of the first robot 160*a*. As such, it may be necessary for the first robot 160*a* to hand-off the electronic device 50 so that the electronic device 50 may be moved to a position that is outside of the reach of the first robot 160.

In various example, the other robot 160, such as the second robot 160*b*, may move the electronic device 50 to a third position P3, which may be proximate to the second nozzle 144*b*. The second robot 160*b* may move the electronic device 50 to the third position P3 to clean the first surface 51 of the electronic device 50. The first surface 51 of the electronic device 50 may be a front or back of the electronic device 50 and may be the same surface that the first robot 160*a* was previously engaged with. Once the electronic device 50 is in the third position P3 and being sprayed by dry ice particles ejected from the second nozzle 144*b*, the second robot 160*b* may move the electronic device 50 in the planar pattern while maintaining the distance D and/or the angle Θ within the tolerances while the electronic device 50 is being sprayed with the dry ice particles that are ejected from the second nozzle 144*b*.

After the first surface 51, the second surface 52, and the third surface 53 are cleaned by the dry ice particles that were ejected from the at least one nozzle 144, the second robot 160*b* may place the electronic device 50 on the at least one conveyor 120, such as an outfeed conveyor 120*b*. The outfeed conveyor 120*b* may convey the electronic device 50 from a position interior to the enclosure 110 to a position exterior to the enclosure 110.

In some embodiments, the position of the robots 160*a*, 160*b* may be staggered (e.g., if a first robot arm is in the rear, left of the enclosure, the second robot arm may be in the front, right of the enclosure). Similarly, the conveyors may be staggered (e.g., the depicted infeed conveyor 120*a* enters the enclosure through the opening in the front portion of the left side wall and the depicted outfeed conveyor 120*b* leaves the enclosure through the opening in the rear portion of the right side wall in the illustrated embodiment.

As discussed, the cleaning system 100 may include a printer that is configured to read the machine-readable symbology that is associated with the electronic device 50 and print the machine-readable symbology on media, such as a sticker. The media with the machine-readable symbology may be reassociated with the electronic device 50, such as adhered to the electronic device 50, so that the electronic device 50 may be tracked as it traverses through the electronic device grading workflow 10.

Providing at least two robots within the enclosure 110 has various benefits. For example, including at least two robots may improve efficiency of the cleaning system 100. In various examples, one of the robots may position the electronic device 50 to be cleaned proximate to one of the nozzles while another one of the robots may position another electronic device 50 to be cleaned proximate to another one of the nozzles. As such, providing at least two robots may allow simultaneous cleaning of at least two devices. In various examples one of the robots may position the electronic device 50 to be cleaned proximate to one of the nozzles while another one of the robots may conduct other tasks, such as picking-up or placing another electronic device 50 on one of the conveyors. In this manner, a new cleaning process may be started for a new electronic device while the original electronic device completes the cleaning process with the second robot.

Exemplary Methods

Referring now to FIG. 8, a flowchart of a method 800 of cleaning an electronic device 50 is provided, in accordance with an example embodiment. The method 800 may include a step 801 of determining size data or pose data of the electronic device 50. For example, at least one vision system 130 may include an image capturing device 131 that is configured to capture image data, such as a photograph, of the electronic device 50. The image of the electronic device 50 may be captured while the electronic device 50 is positioned on the infeed conveyor 120*a*. The at least one vision system 130 may include at least one processor that is configured to analyze the captured image data to determine the size data and/or the pose data of the electronic device 50. The at least one vision system 130 may transmit the size data and/or the pose data to the at least one robot 160, such as the first robot 160*a* and the second robot 160*b*.

The method 800 may include a step 802 of engaging a first surface 51 of the electronic device 50 with an end effector of the first robot 160*a* based on the size data or the pose data. For example, the first robot 160*a* may receive the size data and/or the pose data and use the data to determine a position of the robot arm 161 or robot end effector to make contact with the electronic device 50.

The method 800 may include a step 803 of moving the electronic device 50 with the first robot 160*a* to a first position P1 that is proximate to a first nozzle 144*a*. For example, the first robot 160*a* may move the electronic device 50 to the first position P1, which may define a distance D between a nozzle opening 145 of the first nozzle 144*a* and a surface of the electronic device 50 to be sprayed by the first nozzle 144*a*. The first robot 160*a* may position the electronic device 50 so that an angle Θ is defined between the surface of the electronic device 50 to be sprayed and a path of the dry ice particles to be ejected from the respective nozzle 144. The distance D may be less than 200 mm, such as at least 125 mm and up to 200 mm, such as at least 150 mm and up to 200 mm, such as at least 150 mm and up to 175 mm. The angle Θ may be at least 10 degrees and up to 45 degrees, such as at least 20 degrees and up to 35 degrees, such as at least 25 degrees and up to 30 degrees.

The method 800 may include a step 804 of spraying at least a second surface 52 of the electronic device 50 with dry ice particles that are ejected from the first nozzle 144*a* in an instance in which the electronic device 50 is in the first position P1. The first robot 160*a* may maintain the distance D within a distance tolerance and/or the angle Θ within an angle Θ tolerance while the electronic device 50 is in the respective position and when the dry ice particles are being ejected from the respective nozzle 144. In various examples, the distance D tolerance may be less than 20 mm, such as less than 10 mm, such as less than 5 mm. The angle Θ tolerance may be less than 10 degrees, such as less than 5 degrees, such as less than 2 degrees.

The method 800 may include a step 805 of moving the electronic device 50 with the first robot 160*a* to a second position P2 that is proximate to the first nozzle 144*a* or to a second nozzle 144*b*. The method 800 may include a step 806 of spraying at least a third surface 53 of the electronic device 50 with the dry ice particles that are ejected from the first nozzle 144*a* or the second nozzle 144*b* in an instance in which the electronic device 50 is in the second position P2. For example, once the electronic device 50 is in the second position P2 and being sprayed by dry ice particles, the at least one robot 160 may move the electronic device 50 in the planar pattern while maintaining the distance D and/or the angle Θ within the tolerances while the electronic device 50 is being sprayed with the dry ice particles that are ejected from the first nozzle 144*a* or the second nozzle 144*b*. When the third surface 53 is an edge or a side of the device, the at least one robot 160 may rotate the electronic device 50, while also maintaining the distance D and/or the angle Θ within the tolerances so that all four edges of the electronic device 50 may be cleaned.

The method 800 may include a step of moving the electronic device 50 in a planar pattern with the first robot 160*a* while the electronic device 50 is being sprayed with the dry ice particles that are ejected from the first nozzle 144*a*. For example, the first robot 160*a* may move the electronic device 50 in the planar pattern while also maintaining the distance D and/or the angle Θ within the tolerances.

The method 800 may include a step of engaging the electronic device 50 with an end effector of a second robot 160*b* and releasing the electronic device 50 with the end effector of the first robot 160*a*. The first robot 160*a* may release the electronic device 50 after the second robot 160*b* engages the electronic device 50. The method 800 may include a step of moving the electronic device 50 with the second robot 160*b* to a third position P3 that is proximate to the second nozzle 144*b* and spraying at least the first surface 51 of the electronic device 50 with the dry ice particles that are ejected from the second nozzle 144*b* in an instance in which the electronic device 50 is in the third position P3.

The method 800 may include a step of determining size data and/or pose data of a second electronic device 50 in an instance in which the electronic device 50 is in the third position P3 and while the electronic device 50 is being sprayed by the second nozzle 144*b*. For example, while the second robot 160*b* is facilitating the cleaning of the electronic device 50, the cleaning system 100 may be initiating the cleaning process of a second electronic device 50 by determining the size data and/or pose data of the second electronic device 50 so that the first robot 160*a* may subsequently engage with the second electronic device 50 and facilitate the cleaning of the second electronic device 50. As such, the initiation of the cleaning process of the second electronic device 50 may occur simultaneously with the cleaning of the (first) electronic device 50. This may increase the speed at which a plurality of electronic devices 50, such as two or more, such as three or more, such as five or more electronic devices 50 may be cleaned by the cleaning system 100 because the cleaning of two or more, such as three or more, such as five or more electronic devices 50 may be initiated or in progress while other electronic devices 50 are simultaneously being cleaned by the cleaning system 100.

The method 800 may include a step of engaging a second electronic device 50 with the end effector of the first robot 160*a* while the end effector of the second robot 160*b* is engaging the electronic device 50. For example, while the second robot 160*b* is engaging the electronic device 50 to facilitate the cleaning of the electronic device 50, the first robot 160*a* may be engaging the second electronic device 50 to facilitate the cleaning of the second electronic device 50. As such, cleaning of the second electronic device 50 may occur simultaneously with the cleaning of the (first) electronic device 50. This may increase the speed at which a plurality of electronic devices 50, such as two or more, such as three or more, such as five or more, may be cleaned by the cleaning system 100 because two or more, such as three or more, such as five or more electronic devices 50 may be simultaneously cleaned by the cleaning system 100.

Exemplary Cleaning System Computing Device

FIG. 9 is a diagram of a cleaning system computing device 190. The cleaning system computing device 190 may be configured to facilitate executing cleaning operations of the cleaning system 100. The cleaning system computing device 190 may include at least one processor 191, at least one memory 192, communications circuitry 193, input/output circuitry 194, data storage circuitry 195, and/or motion-planning circuitry 196 that may be in electronic communication with one another via a system bus 199. The system bus 199 may be a computer bus that connects the components of the cleaning system computing device 190 to enable data transfer and communications between the components. The cleaning system computing device 190 may include vision system circuitry 197 and/or machine learning model circuitry 198 that may be in electronic communication with the other components of the cleaning system computing device 190 via the system bus 199.

In general, the terms computing device, system, entity, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes may be performed on data, content, information, and/or similar terms used herein interchangeably. In this regard, the cleaning system computing device 190 embodies a particular, specially configured computing system transformed to enable the specific operations described herein and provide the specific advantages associated therewith, as described herein.

Although components and methods of the cleaning system 100 and the electronic device grading system 900 (FIG. 10) are often described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. In some embodiments, other elements of the cleaning system computing device 190 provide or supplement the functionality of another particular set of circuitry. For example, the processor 191 in some embodiments provides processing functionality to any of the sets of circuitry, the memory 192 provides storage functionality to any of the sets of circuitry, the communications circuitry 193 provides network interface functionality to any of the sets of circuitry, and/or the like.

The at least one processor 191 may be embodied in a number of different ways and may, for example, include one or more processing devices configured to perform independently. Additionally, or alternatively, the at least one processor 191 may include one or more processors configured in tandem via a bus to enable independent execution of instructions, pipelining, and/or multithreading. Additionally, in some embodiments, the at least one processor 191 may include one or more processors, some which may be referred to as sub-processors, to control one or more components, modules, or circuitry of the cleaning system computing device 190.

The at least one processor 191 may be embodied as one or more complex programmable logic devices (CPLDs), microprocessors, multi-core processors, co-processing entities, application-specific instruction-set processors (ASIPs), and/or controllers. Further, the at least one processor 191 may be embodied as one or more other processing devices or circuitry. The term circuitry may refer to a hardware embodiment or a combination of hardware and computer program products. Thus, the at least one processor 191 may be embodied as integrated circuits, application specific integrated circuits (ASICs), field programmable gate arrays (FPGAs), programmable logic arrays (PLAs), hardware accelerators, another circuitry, and/or the like. As will therefore be understood, the at least one processor 191 may be configured for a particular use or configured to execute instructions stored in volatile or non-volatile media or otherwise accessible to the at least one processor 191. As such, whether configured by hardware or computer program products, or by a combination thereof, the at least one processor 191 may be capable of performing steps or operations according to embodiments of the present disclosure when configured accordingly.

In an example embodiment, the at least one processor 191 may be configured to execute instructions stored in the memory 192 or otherwise accessible to the processor 191. Alternatively, or additionally, the at least one processor 191 may be configured to execute hard-coded functionality. As such, whether configured by hardware or software methods, or by a combination thereof, the processor 191 may represent an entity (e.g., physically embodied in circuitry) capable of performing operations according to an embodiment of the present disclosure while configured accordingly. Alternatively, as another example, when the at least one processor 191 is embodied as an executor of software instructions, the instructions may specifically configure the processor 191 to perform the algorithms and/or operations described herein when the instructions are executed.

In some embodiments, the memory 192 may be non-transitory and may include, for example, one or more volatile and/or non-volatile memories. In other words, for example, the memory 192 may be an electronic storage device (e.g., a computer readable storage medium). The memory 192 may be configured to store information, data, content, applications, instructions, or the like, for enabling the cleaning system computing device 190 to carry out various functions in accordance with example embodiments of the present disclosure. In this regard, the memory 192 may be preconfigured to include computer-coded instructions (e.g., computer program code), and/or dynamically be configured to store such computer-coded instructions for execution by the at least one processor 191.

In an example embodiment, the cleaning system computing device 190 further includes a communications circuitry 193 that may enable the cleaning system computing device 190 to transmit data and/or information to other devices (e.g., the at least one robot 160, the at least one conveyor 120, the at least one vision system 130, and/or the at least one dry ice blasting machine 140) and/or other systems (e.g., the visual grading system 20 and/or the polishing system 40) through a network. The communications circuitry 193 may be any means such as an electronic device 50 or circuitry embodied in either hardware or a combination of hardware and software that is configured to receive and/or transmit data from/to a network and/or any other device, circuitry, or module in communication with the cleaning system computing device 190. In this regard, the communications circuitry 193 may include, for example, a network interface for enabling communications with a wired or wireless communication network. For example, the communications circuitry 193 may include one or more circuitries, network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

In some embodiments, the cleaning system computing device 190 includes input/output circuitry 194 that may, in turn, be in communication with the at least one processor 191 to provide output to the user and, in some embodiments, to receive an indication of a user input. The input/output circuitry 194 may comprise an interface or the like. In some embodiments, the input/output circuitry 194 may include a keyboard, a mouse, a joystick, a touch screen, touch areas, soft keys, a microphone, a speaker, or other input/output mechanisms. The at least one processor 191 and/or input/output circuitry 194 may be configured to control one or more functions of one or more user interface elements through computer program instructions (e.g., software and/or firmware) stored on a memory accessible to the processor (e.g., memory 192). The at least one processor 191 and/or input/output circuitry 194 may also be configured to control one or more image capturing devices integrated by the cleaning system 100, such as one or more image capturing devices 131 of the vision system 130.

In some embodiments, the cleaning system computing device 190 includes a display that may, in turn, be in communication with the at least one processor 191 to display user interfaces (such as, but not limited to, display of a call and/or an application). In some embodiments of the present disclosure, the display may include a liquid crystal display (LCD), a light-emitting diode (LED) display, a plasma (PDP) display, a quantum dot (QLED) display, and/or the like.

In some embodiments, the cleaning system computing device 190 includes the data storage circuitry 195 which comprises hardware, software, firmware, and/or a combination thereof, that supports functionality for generating, storing, and/or maintaining one or more data objects associated with the cleaning system 100. For example, in some embodiments, the data storage circuitry 195 includes hardware, software, firmware, and/or a combination thereof, that stores data related to image data captured by an image capturing device in the datastore. Additionally or alternatively, the data storage circuitry 195 also stores and maintains data related to one or more cleaning operations in the datastore 920. In some embodiments, the data storage circuitry 195 may be integrated with, or embodied by, the datastore. In some embodiments, the data storage circuitry 195 includes a separate processor, specially configured field programmable gate array (FPGA), or a specially programmed application specific integrated circuit (ASIC).

In some embodiments, the cleaning system computing device 190 includes motion-planning circuitry 196 which comprises hardware, software, firmware, and/or a combination thereof, that supports functionality for controlling the movement of at least one robot 160, controlling the movement of at least one conveyor 120, controlling the vision system 130, controlling the dry ice blasting machine 140, or a combination thereof. In one or more embodiments, the motion-planning circuitry 196 works in conjunction with the at least one processor 191 and one or more components of the cleaning system computing device 190 to cause execution of a cleaning operation with respect to at least one electronic device 50. For example, the motion-planning circuitry 196 in conjunction with the at least one processor 191 and/or the communications circuitry 193 may transmit, to the at least one robot 160, signals configured to cause manipulation of the electronic device 50. The signals configured to cause manipulation of the electronic device 50 may be generated by the motion-planning circuitry 196 based on a motion-planning model generated for a particular electronic device 50 based on size data and/or pose data associated with the electronic device 50.

In this regard, the motion-planning circuitry 196 may execute one or more operations related to generating and/or executing a motion-planning model related to a particular cleaning operation. For example, the motion-planning circuitry 196 may initiate one or more variables related to one or more functions, equations, methods, and/or the like related to the motion-planning model of a particular cleaning operation. Additionally, the motion-planning circuitry 196 may generate, initialize, and/or determine one or more position registers associated with the electronic device 50 during the execution of the motion-planning model related to a respective cleaning operation. Furthermore, the motion-planning circuitry 196 may generate, initialize, and/or determine one or more of a working offset, working orientation, and/or one or more reference points (e.g., starting points, working points, and/or points of rotation) for an electronic device 50 associated with a particular cleaning operation.

In some embodiments, the cleaning system computing device 190 includes vision system circuitry 197 which comprises hardware, software, firmware, and/or a combination thereof, that supports functionality for capturing image data related to a respective electronic device 50 and determining from the captured image data size data and/or pose data of the electronic device 50 and/or reading machine-readable symbology associated with the electronic device 50. In this regard, the vision system circuitry 197 may direct one or more image capturing devices to capture image data related to a respective electronic device 50. For example, in some embodiments, the vision system circuitry 197 may direct one or more image capturing devices to capture image data related to the electronic device 50 in order to generate a continuous image of the electronic device 50. The vision system circuitry 197 may compare the continuous image to other previously collected image data stored in the datastore 920 via a size and/or pose detection model. In some embodiments, the vision system circuitry 197 may execute one or more pre-processing steps on the image data to facilitate input into the size and/or pose detection model. Additionally or alternatively, the vision system circuitry 197 may apply one or more filters to the image data including, but not limited to, a gaussian blur filter, an inversion filter, color corrections such as a grayscale conversion filter, and/or one or more linear filters. In some embodiments, applying the one or more filters may enable higher accuracy of size and/or pose detection when processing the at least one image of one or more respective electronic devices 50.

In exemplary embodiments, the cleaning system computing device 190 includes machine learning model circuitry 198 which comprises hardware, software, firmware, and/or a combination thereof, that supports functionality for creating, training, updating, and/or maintaining one or more machine learning (ML) models (e.g., a size and/or pose detection model) according to various embodiments of the present disclosure. In various embodiments, the machine learning model circuitry 198 may work in conjunction with the at least one processor 191, the input/output circuitry 194, the motion-planning circuitry 196, and/or the vision system circuitry 197 to create, train, update, and/or maintain the one or more models associated with the cleaning system 100. Additionally, in some embodiments, the machine learning model circuitry 198 may control one or more image capturing devices associated with the cleaning system 100 and/or receive image data, directly or indirectly, captured by the image capturing devices to facilitate the training of the one or more models associated with the cleaning system 100.

In some embodiments, two or more of the sets of circuitries 193-198 are combinable. Additionally or alternatively, in some embodiments, one or more of the sets of circuitry perform some or all of the functionality described associated with another component. For example, in some embodiments, two or more of the sets of circuitries 193-198 are combined into a single module embodied in hardware, software, firmware, and/or a combination thereof. Similarly, in some embodiments, one or more of the sets of circuitries, for example the communications circuitry 193, the data storage circuitry 195, the motion-planning circuitry 196, the vision system circuitry 197 and/or the machine learning model circuitry 198 is/are combined with the at least one processor 191, such that the at least one processor 191 performs one or more of the operations described above with respect to each of these sets of circuitries 193-298.

Exemplary Device Grading System

FIG. 10 is a diagram of an electronic device grading system 900, in accordance with an example embodiment. The electronic device grading system 900 may include a cleaning system 100, as previously described. The electronic device grading system 900 may include a visual grading system 20 and/or a polishing system 40. The electronic device grading system 900 may include a central computing device 910, a datastore 920, and/or a network 930 configured to facilitate the execution of the various functions of the visual grading system 20, the cleaning system 100, and/or the polishing system 40.

The visual grading system 20 may include at least one image capturing device 22 and a grading system computing device 24. As previously discussed, the visual grading system 20 may be configured to determine the quality grade of at least one electronic device 50. The polishing system 40 may include a polisher 42 and a polishing system computing device 44. As previously discussed, the polishing system 40 may be configured to polish the at least one electronic device 50.

The grading system computing device 24 and/or the polishing system computing device 44 may include hardware that is configured the same as, or similar to, the hardware of the cleaning system computing device 190. For example, the grading system computing device 24 and/or the polishing system computing device 44 may include at least one processor, memory, communications circuitry, input/output circuitry, data storage circuitry, motion-planning circuitry, vision system circuitry, and/or machine learning model circuitry that may be in electronic communication with one another via a system bus. The hardware of the grading system computing device 24 may be modified and used to implement and facilitate the various functions of the visual grading system 20 (e.g., functions associated with determining a quality grade of the at least one electronic device 50). The hardware of the polishing system computing device 44 may be modified and used to implement and facilitate the various functions of the polishing system 40 (e.g., functions associated with polishing the at least one electronic device 50).

The central computing device 910 may include hardware that is configured the same as, or similar to, the hardware of the cleaning system computing device 190, as previously described. For example, the central computing device 910 may include at least one processor, memory, communications circuitry, input/output circuitry, data storage circuitry, motion-planning circuitry, vision system circuitry, and/or machine learning model circuitry that may be in electronic communication with one another via a system bus. The hardware of the central computing device 910 may be modified and used to implement and facilitate the various functions of the visual grading system 20 (e.g., functions associated with determining a quality grade of the at least one electronic device 50), the cleaning system 100 (e.g., functions associated with cleaning the at least one electronic device 50, and/or the polishing system 40 (e.g., functions associated with polishing the at least one electronic device 50). In various examples, at least one of the visual grading system 20, the cleaning system 100, and/or the polishing system 40 do not include a respective computing device 24, 190, 44.

In various examples, the datastore 920 may house some or all of data, models, algorithms, or the like, associated with an electronic device 50 grading operation, a cleaning operation, and/or a polishing operation for retrieval by the central computing device 910. In various embodiments, any data and/or executable code used in or useful for any of the embodiments discussed herein may be stored on the datastore 920. Hardware suitable for use as part of a datastore include all forms of non-volatile memory, media and memory devices, including by way of example, and without limitation, semiconductor memory devices, e.g., EPROM, EEPROM, and flash memory devices; magnetic disks, e.g., internal hard disks or removable disks; magneto-optical disks; and CD-ROM and DVD-ROM disks.

In various examples, the network 930 integrated with the electronic device grading system 900 is any suitable network or combination of networks and supports any appropriate protocol suitable for communication of data to and from components of the electronic device grading system 900. In some embodiments, the network 930 may connect the components of the electronic device grading system 900 with one or more external computing devices, including, but not limited to, one or more mobile devices. According to various embodiments, the network 930 may include a public network (e.g., the Internet), a private network (e.g., a network within an organization), or a combination of public and/or private networks. According to various embodiments, the network 930 is configured to provide communication between various components of the electronic device grading system 900. According to various embodiments, network 930 may comprise one or more networks that connect devices and/or components in the network layout to allow communication between the devices and/or components. For example, the network 930 may be implemented as the Internet, a wireless network, a wired network (e.g., Ethernet), a local area network (LAN), a Wide Area Network (WANs), Bluetooth, Near Field Communication (NFC), Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or any other type of network that provides communications between one or more components of the network layout. In some embodiments, network 930 is implemented using cellular networks, satellite, licensed radio, or a combination of cellular, satellite, licensed radio, and/or unlicensed radio networks. In one or more embodiments, the communications circuitry, such as communications circuitry 193, comprised in the computing devices 190, 910, 24, 44 may transmit and receive data to and from the electronic device grading system 900 via the network 930.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A cleaning system for cleaning an electronic device, the cleaning system comprising:

at least one vision system comprising at least one processor;

a first nozzle configured to eject dry ice particles;

a second nozzle configured to eject dry ice particles;

a first robot comprising an end effector; and a second robot comprising an end effector, at least one computing device in communication with the first robot, the second robot, the first nozzle, and the second nozzle, wherein the at least one computing device is configured to cause the cleaning system to: determine size data and/or pose data of the electronic device; engage a first surface of the electronic device with the end effector of the first robot based on the size data or the pose data; move the electronic device with the first robot to a first position that is proximate to the first nozzle; spray at least a second surface of the electronic device with dry ice particles that are ejected from the first nozzle in an instance in which the electronic device is in the first position; move the electronic device with the first robot to a second position that is proximate to the first nozzle or to the second nozzle; spray at least a third surface of the electronic device with the dry ice particles that are ejected from the first nozzle or the second nozzle in an instance in which the electronic device is in the second position; engage the electronic device with the end effector of the second robot; and move the electronic device with the second robot to a third position that is proximate to the second nozzle.

2. The cleaning system of claim 1, wherein the at least one computing device is configured to move the electronic device with the first robot to maintain a predetermined distance and a predetermined angle between the electronic device and the first nozzle in an instance in which the first robot is positioning the electronic device proximate to the first nozzle and the electronic device is being cleaned.

3. The cleaning system of claim 2, wherein the predetermined angle is at least 25 degrees and up to 30 degrees and the predetermined distance is at least 150 millimeters and up to 200 millimeters.

4. The cleaning system of claim 1, further comprising:

an enclosure comprising a plurality of walls; and at least one acoustic panel coupled to at least one wall of the plurality of walls.

5. The cleaning system of claim 1, further comprising an enclosure comprising a plurality of walls, wherein the first robot and the second robot are positioned within the enclosure.

6. The cleaning system of claim 1, wherein the first robot and the second robot comprise six-axis robot arms configured to engage the electronic device simultaneously.

7. The cleaning system of claim 1, wherein the at least one computing device is configured to cause the cleaning system to engage a second electronic device with the first robot or the second robot while the other of the first robot or the second robot is engaging the electronic device.

8. The cleaning system of claim 1, further comprising an enclosure comprising plurality of walls and a ceiling, wherein the first nozzle or the second nozzle is positioned on or proximate the ceiling of the enclosure and the other of the first nozzle or the second nozzle is positioned on or proximate a wall of the plurality of walls.

9. The cleaning system of claim 1, further comprising an enclosure comprising plurality of walls and a ceiling wherein:

the enclosure comprises at least one opening sized for the electronic device to enter the enclosure through the at least one opening, the cleaning system further comprises at least one conveyor, each conveyor extending through a corresponding opening and positioned at least partially within the enclosure, and the at least one computing device is configured to cause the cleaning system to engage the electronic device with the first robot while the electronic device is positioned on the at least one conveyor.

10. The cleaning system of claim 9, wherein the at least one computing device is configured to: cause the at least one vision system of the cleaning system to transmit the pose data and the size data to the first robot, and use the pose data and the size data to facilitate engagement of the end effector of the first robot with the electronic device while the electronic device is positioned on the at least one conveyor.

11. The cleaning system of claim 9, wherein the at least one vision system is configured to read machine-readable symbology that is associated with the electronic device while the electronic device is positioned on the at least one conveyor.

12. A method of cleaning an electronic device, the method comprising:

determining size data and/or pose data of the electronic device;

engaging a first surface of the electronic device with an end effector of a first robot based on the size data or the pose data;

moving the electronic device with the first robot to a first position that is proximate to a first nozzle;

spraying at least a second surface of the electronic device with dry ice particles that are ejected from the first nozzle in an instance in which the electronic device is in the first position;

moving the electronic device with the first robot to a second position that is proximate to the first nozzle or to a second nozzle;

spraying at least a third surface of the electronic device with the dry ice particles that are ejected from the first nozzle or the second nozzle in an instance in which the electronic device is in the second position;

engaging the electronic device with an end effector of a second robot; and moving the electronic device with the second robot to a third position that is proximate to the second nozzle.

13. The method of claim 12, wherein in an instance in which the second surface of the electronic device is being sprayed with the dry ice particles, a predetermined angle is defined between the second surface and a path of the dry ice particles being ejected from the first nozzle.

14. The method of claim 12, further comprising moving the electronic device in a planar pattern with the first robot while the electronic device is being sprayed with the dry ice particles that are ejected from the first nozzle.

15. The method of claim 12, further comprising releasing the electronic device with the end effector of the first robot after engaging the electronic device with the end effector of the second robot.

16. The method of claim 12, further comprising spraying at least the first surface of the electronic device with the dry ice particles that are ejected from the second nozzle in an instance in which the electronic device is in the third position.

17. The method of claim 16, further comprising determining size data or pose data of a second electronic device in an instance in which the electronic device is in the third position and while the electronic device is being sprayed by the second nozzle.

18. The method of claim 12, further comprising engaging a second electronic device with the end effector of the first robot while the end effector of the second robot is engaging the electronic device.

* * * * *